US006502544B2

(12) United States Patent
Kubota et al.

(10) Patent No.: US 6,502,544 B2
(45) Date of Patent: Jan. 7, 2003

(54) METHOD AND APPARATUS FOR PROCESSING OUTPUT OF POSITION MEASUREMENT SENSOR

(75) Inventors: Takamitsu Kubota, Kariya (JP); Naoyuki Kamiya, Kariya (JP); Hirofumi Hagio, Handa (JP); Takashi Hamaoka, Kariya (JP)

(73) Assignee: Denso Corporation, Aichi-Pref. (JP)

( * ) Notice: Subject to any disclaimer, the term of this patent is extended or adjusted under 35 U.S.C. 154(b) by 18 days.

(21) Appl. No.: 09/739,333

(22) Filed: Dec. 19, 2000

(65) Prior Publication Data

US 2001/0004213 A1 Jun. 21, 2001

(30) Foreign Application Priority Data

Dec. 21, 1999 (JP) ............................................ 11-362180

(51) Int. Cl.[7] ................................................ F02D 9/08
(52) U.S. Cl. ...................................... 123/396; 123/399
(58) Field of Search ................................ 123/337, 361, 123/376, 377, 198 D, 395, 396, 397, 398, 399; 73/117.3, 118.2

(56) References Cited

U.S. PATENT DOCUMENTS

| 5,136,880 | A | * | 8/1992 | Norgauer | 73/117.3 |
| 5,447,134 | A | * | 9/1995 | Yokoyama | 123/399 |
| 5,544,000 | A | | 8/1996 | Suzuki et al. | 361/139 |
| 5,669,353 | A | * | 9/1997 | Shirai et al. | 123/399 |
| 5,823,164 | A | * | 10/1998 | Seki et al. | 123/361 |
| 5,960,771 | A | * | 10/1999 | Watanabe | 123/396 |
| 6,075,371 | A | * | 6/2000 | Kitamura | 324/716 |

FOREIGN PATENT DOCUMENTS

| EP | 1111343 | * | 6/2001 | ............ F02D/9/00 |
| JP | 5-107017 | | 4/1993 | |

* cited by examiner

Primary Examiner—Tony M. Argenbright
Assistant Examiner—Hai Huynh
(74) Attorney, Agent, or Firm—Nixon & Vanderhye PC

(57) ABSTRACT

If outputs of a couple of Hall ICs constituting a throttle valve position sensor are within an operating range of throttle valve position, and if a relationship between the outputs are within a predetermined error range, both the Hall ICs are determined to be normal. In contrast, if the outputs are equal to an upper clamp voltage or a lower clamp voltage, and if a relationship between the outputs is out of the predetermined error range, at least one of the Hall ICs is determined to be abnormal. Furthermore, if the outputs are within a failure reference voltage range, it is determined that there is an abnormality between the throttle valve position sensor and an ECU. In this way, abnormalities in the sensor and abnormalities between the sensor and the ECU can also be detected.

12 Claims, 5 Drawing Sheets

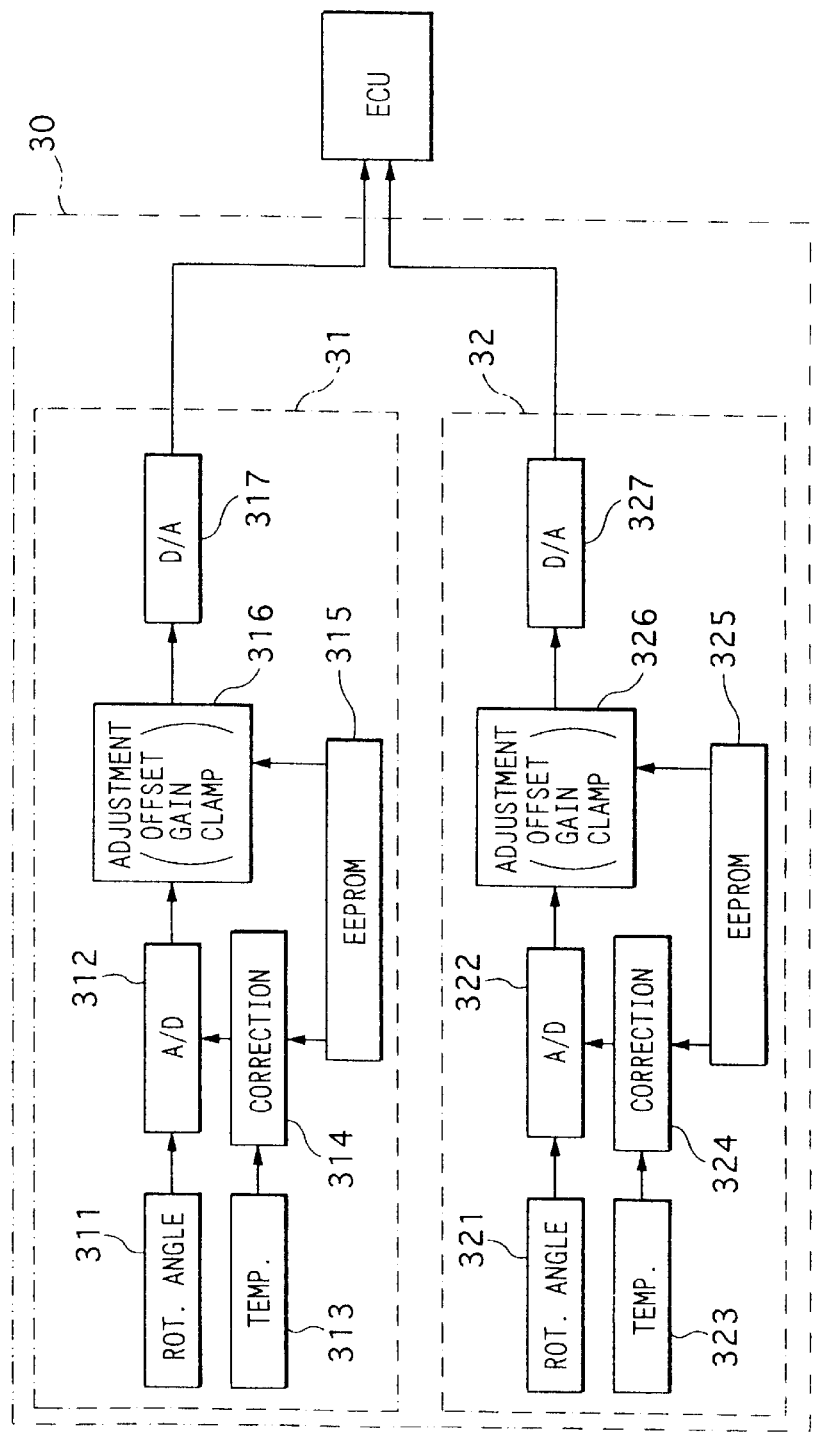

METHOD AND APPARATUS FOR PROCESSING OUTPUT OF POSITION MEASUREMENT SENSOR

CROSS REFERENCE TO RELATED APPLICATION

This application is based on and incorporates herein by reference Japanese Patent Application No. 11-362180 filed on Dec. 21, 1999.

BACKGROUND OF THE INVENTION

The present invention relates to a method and apparatus for processing an output of a position measurement sensor having non-contact type measurement elements for measuring a position of a movable body. For instance, such a method can be used for failure determination of a throttle valve position sensor having non-contact type measurement elements (e.g., Hall elements, a Hall ICs or the like) for measuring a rotational angle of a throttle valve that adjusts the amount of intake air supplied to an internal combustion engine.

There is one type of known throttle valve position sensor that has a couple of Hall ICs to provide double outputs, implementing a redundant system and allowing detection of a failure mode of the Hall ICs.

In such a throttle valve position sensor, a difference between an output of one Hall IC and an output of another Hall IC is continuously compared with a reference value to detect a failure mode. For instance, once a position of the throttle valve is incremented to fall within a high throttle valve position zone, an output of at least one Hall IC is raised and is fixed at 5 (V) that is equal to a power supply voltage applied to the sensor. Even if this Hall IC is normal, it is impossible to determine whether there is any abnormality (e.g., short circuit) in the Hall IC based on the output of the Hall IC. As a result, a detectable range of the failure mode of the throttle valve position sensor is disadvantageously limited to a lower throttle valve position zone within an operating range of the throttle valve position.

SUMMARY OF THE INVENTION

The present invention addresses the described disadvantage. Therefore, it is an objective of the present invention to provide a method and apparatus for processing an output of a redundant position measurement sensor having a couple of non-contact type measurement elements for measuring a position of a movable body, the method allowing detection of all failure modes of the sensor throughout an entire operating range of the movable body.

To achieve the objective of the present invention, there are provided a method and apparatus for processing an output of a redundant position measurement sensor having a couple of non-contact type measurement elements for measuring a position of a movable body. Maximum and minimum output voltages of the measurement elements are set to exceed upper and lower tolerance limits for output voltages of the measurement elements at upper and lower borders of an operating range of the measurement elements, respectively. Furthermore, the maximum and minimum output voltages of the measurement elements are also set to fall between upper and lower failure reference voltage ranges. The upper and lower failure reference voltage ranges are set by an electronic control unit connected to the measurement elements and are provided at upper and lower borders of a power supply voltage applied to the measurement elements, respectively.

BRIEF DESCRIPTION OF THE DRAWINGS

The invention, together with additional objects, features and advantages thereof, will be best understood from the following description, the appended claims and the accompanying drawings in which:

FIG. 3 is a block diagram showing a flow of throttle valve position information provided through an internal computation within the Hall ICs constituting the throttle valve position sensor of FIG. 1;

DETAILED DESCRIPTION OF THE INVENTION

One embodiment of the present invention will now be described with reference to the accompanying drawings.

Figure 1:
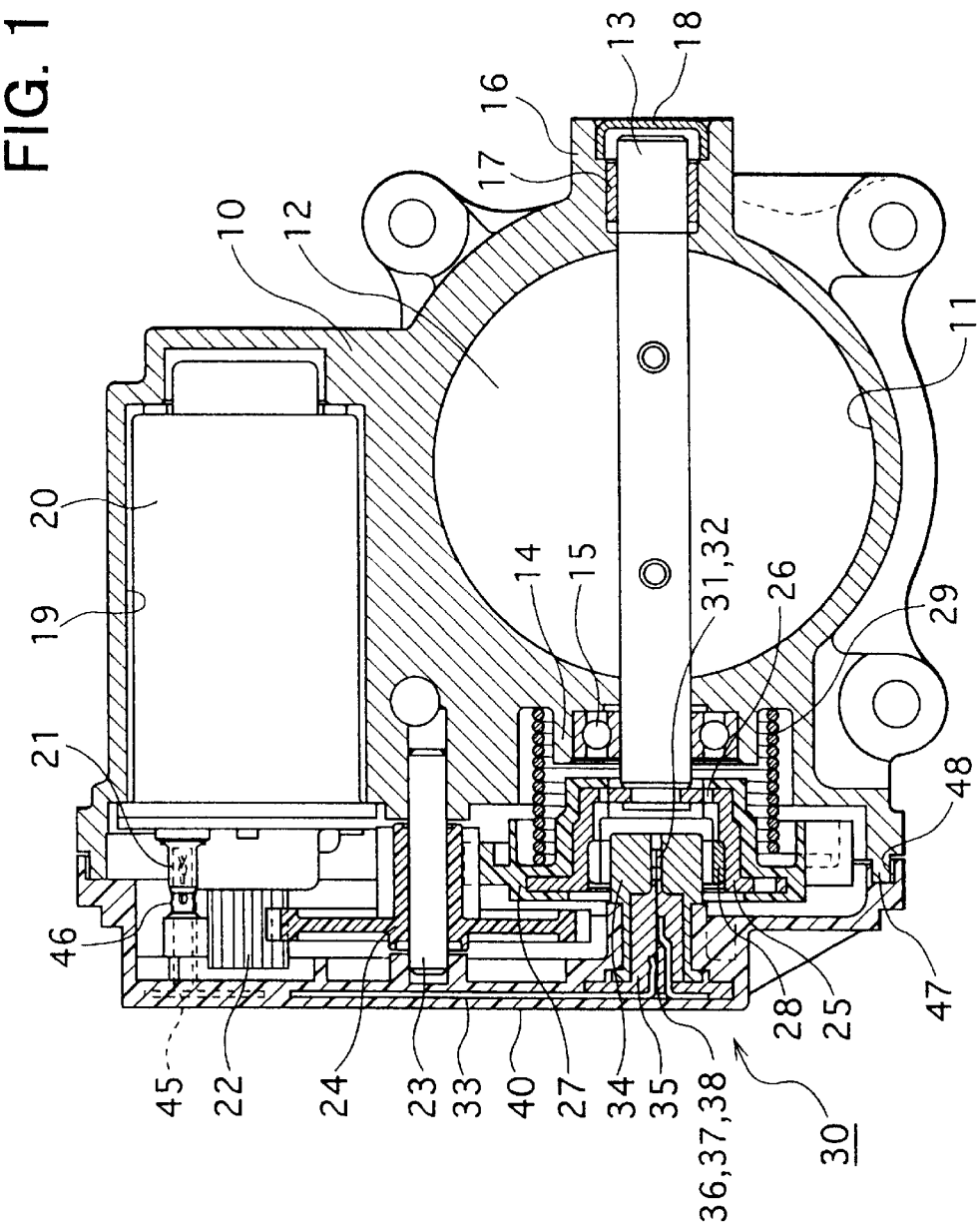
FIG. 1 is a cross-sectional view of an intake air flow control system for an internal combustion engine, to which a method for processing an output of a position measurement sensor in accordance with one embodiment of the present invention is applied.

With reference to FIG. 1, an intake air flow control system for an internal combustion engine according to the present embodiment includes a throttle body 10 defining an intake air passage 11 leading to the internal combustion engine (not shown), a substantially disc-shaped throttle valve 12 secured to and supported by a rotatable shaft 13 in a rotatable manner within the intake air passage 11, an electric motor 20 acting as an actuator connected to the rotatable shaft 13 via gears, and a throttle valve position sensor 30 for measuring a throttle valve position as a rotational angle of the throttle valve 12. Output signals, such as those of the throttle valve position sensor 30, are inputted to an electronic control unit (ECU). In the ECU, a drive signal is computed based on an operating condition of the internal combustion engine. Based on the computed drive signal, the electric motor 20 is driven to adjust the position of the throttle valve 12 to a desired position.

The throttle body 10 is manufactured by aluminum die-casting and is secured to an intake manifold (not shown) of the internal combustion engine with, for example, bolts. One end of the rotatable shaft 13 of the throttle valve 12 is rotatably supported by a ball bearing 15 that is in turn supported by a bearing holder 14 of the throttle body 10. Other end of the rotatable shaft 13 is rotatably supported by a thrust bearing 17 that is in turn supported by a bearing holder 16 of the throttle body 10. A cap 18 is fitted into the bearing holder 16 of the throttle body 10. The amount of the intake air supplied to the internal combustion engine is adjusted by a size of an opening that is formed as the throttle valve 12 is rotated relative to the intake air passage 11 of the throttle body 10.

The electric motor 20 is housed in a motor housing 19 defined in the throttle body 10. The motor 20 has a motor power supply terminal 21, which protrudes from the motor 20, and a pinion gear 22, which is fitted around a distal end of an output shaft of the motor 20. Around a rotor 25 that is secured to the one end of the rotatable shaft 13, a resin gear 27 is coupled by insert molding. On an inner peripheral surface of the rotor 25, there is fixedly secured a cylindrical permanent magnet 28. The pinion gear 22 is in gear engagement with the resin gear 27 via an intermediate reduction gear 24 that rotates about a fixed shaft 23 secured to the throttle body 10. Around the outer peripheral of the resin gear 27 that is integral with the rotor 25, there is provided a return coil spring 29 for urging the throttle valve 12 to the initial throttle valve position via the rotatable shaft 13 when the motor 20 is turned off by, for example, turning off an ignition switch (not shown). Positioning holes 26 extend through the rotor 25 for securing the rotor 25 at a position that coincides with an idle position of the rotatable shaft 13.

In the present embodiment, the throttle valve 12 can be rotated from a full throttle valve position (90 degrees) through a closed throttle valve position (0 degree) to an initial throttle valve position (−10 degrees), which is a mechanical stop position of the throttle valve 12.

The throttle valve position sensor 30 includes the cylindrical permanent magnet 28, a couple of Hall ICs 31, 32, a lead frame 33 and a split stator 34. The cylindrical permanent magnet 28 acts as a magnetic field generating source. The Hall ICs 31, 32 act as redundant non-contact type measurement elements and are integrally formed with a resin sensor cover 40. The lead frame 33 is made of a conductive thin metal plate for electrically connecting the Hall ICs 31, 32 with the external ECU. The split stator 34 is made of magnetic material for concentrating the magnetic flux on the Hall ICs 31, 32.

The Hall ICs 31, 32 are opposed to the inner peripheral surface of the permanent magnet 28 to cause generation of electromotive force in response to generation of an N pole magnetic field or a S pole magnetic field on their magneto-sensitive surfaces (generating a positive (+) electric potential and a negative (−) electric potential by the N pole magnetic field and the S pole magnetic field, respectively). The Hall ICs 31, 32 of the present embodiment are arranged in parallel and are arranged to face in opposite directions (rotated 180 degrees).

Figure 2:
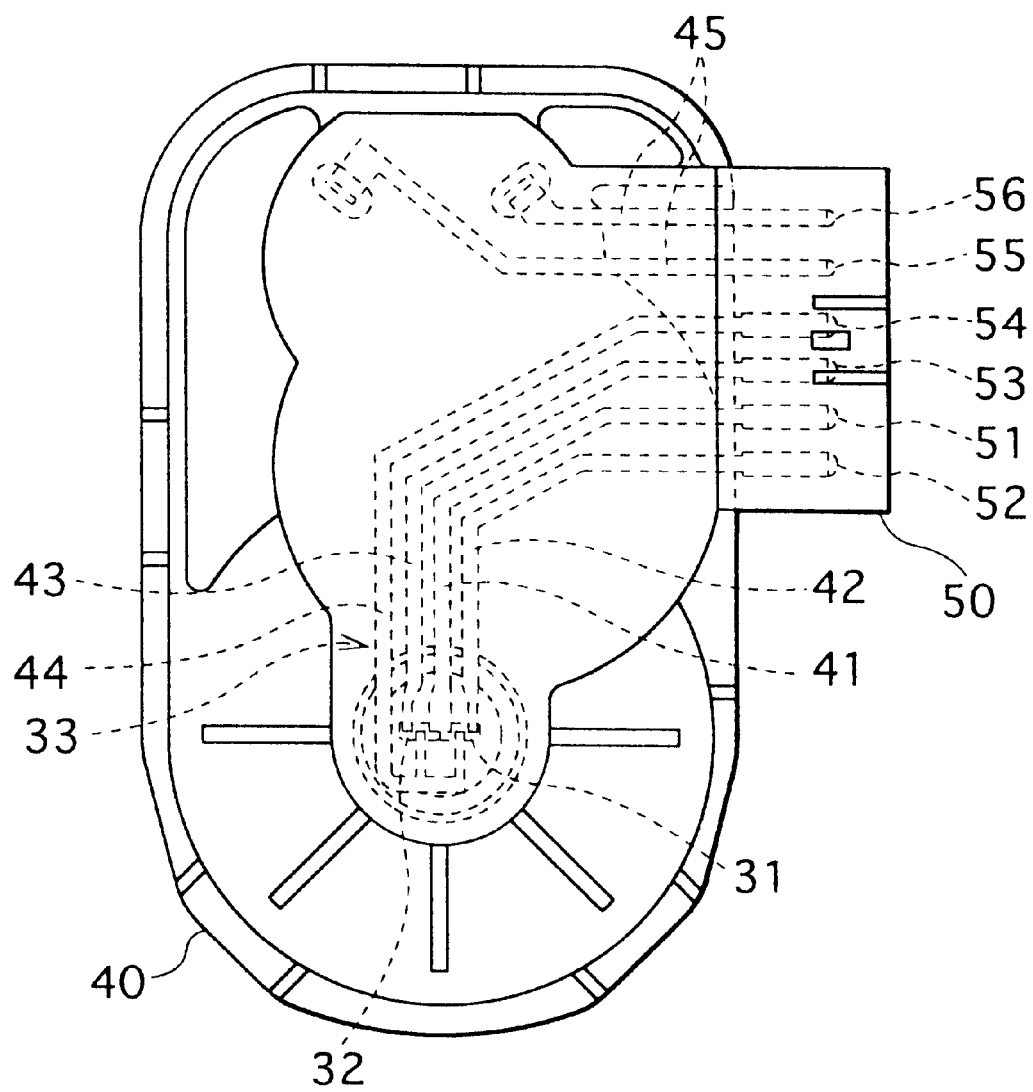
FIG. 2 is a left side view as seen in FIG. 1.

With reference to FIG. 2, the lead frame 33 is made, for example, of a copper plate (conductive thin metal plate). The lead frame 33 includes a signal input terminal (VDD) 41, output terminals (OUT 1, OUT 2) 42, 43 and a ground terminal (GND) 44. The signal input terminal (VDD) 41 is fed, for example, with a 5 (V) power supply voltage. The output terminals (OUT 1, OUT 2) 42, 43 output a signal indicative of a position of the throttle valve 12. Each of a signal input lead (VDD) 36, a ground lead (GND) 37 and an output lead (OUT 1, OUT 2) 38 of the Hall ICs 31, 32 is connected with the lead frame 33. A connection between each described lead and the lead frame 33 is covered with a connection holder 35 made of a thermoplastic resin, such as PBT. Two stator halves constituting the split stator 34 are secured around the outer peripheral of the connection holder 35 in a manner that provides a predetermined gap between the stator 34 and the Hall ICs 31, 32.

The sensor cover 40 closes an opening of the throttle body 10. The sensor cover 40 is a thermoplastic resin molded product (such as, one made of PBT), which is lightweight, easy to manufacture and inexpensive and electrically insulates each terminal of the throttle valve position sensor 30 from other terminals. A recess 48 is formed on the sensor cover 40 to engage with a protrusion 47 formed at the opening side of the throttle body 10. Upon engagement of the recess 48 and the protrusion 47, the sensor cover 40 is secured to the throttle body 10 by a clip (not shown), completing the assembling of the sensor cover 40 and the throttle body 10. When the protrusion 47 of the throttle body 10 is engaged with the recess 48 of the sensor cover 40, the Hall ICs 31, 32, which are secured on the sensor cover 40, are correctly aligned with the permanent magnet 28, which is secured to the inner peripheral side of the rotor 25 that integrally rotates with the rotatable shaft 13 of the throttle valve 12.

Furthermore, as shown in FIG. 2, the connector 50 that is integrally formed on a lateral side surface of the sensor cover 40 has a distal end 51 of the signal input terminal 41, distal ends 52, 53 of the output terminals 42, 43, a distal end 54 of the ground terminal 44 and distal ends 55, 56 of a motor power feed terminal 45 of the motor 20. Other ends of the motor power feed terminal 45 are integrally connected with a motor connection terminal 46. Once the throttle body 10 is assembled with the sensor cover 40, the motor power supply terminal 21 of the motor 20 is connected to the motor power feed terminal 45 via the motor connection terminal 46.

A flow of throttle valve position information provided through an internal computation in the Hall ICs 31, 32 will now be described with reference to FIG. 3.

With reference to FIG. 3, a rotational angle value indicative of a position of the throttle valve 12 is measured with a rotational angle measurement unit 311, 321 via a Hall element in each Hall IC 31, 32. The measured rotational angle value is then inputted to an A/D converter 312, 322. Furthermore, a temperature value indicative of a change in the ambient temperature is measured with a temperature measurement unit 313, 323 in each Hall IC 31, 32. The measured temperature value is then inputted to a correction circuit 314, 324 for correcting temperature characteristics.

A corresponding set point for the measured temperature value previously stored in an EEPROM (Electrical Erasable Programmable ROM) 315, 325 is inputted to the correction circuit 314, 324, and the measured temperature value is corrected based on the set point in the correction circuit 314, 324 and is then inputted to the A/D converter 312, 322. The value inputted to the A/D converter 312, 322 is converted from analog to digital and is then inputted to an adjustment circuit 316, 326. In the adjustment circuit 316, 326, an offset adjustment, a gain adjustment and a clamp adjustment are carried out based on a corresponding set point stored in the EEPROM 315, 325. In the offset adjustment, an offset of a sensor output (V) indicative of the throttle valve position (degrees) is adjusted. In the gain adjustment, a slope of the sensor output (V) indicative of the throttle valve position (degrees) is adjusted. In the clamp adjustment, an upper clamp voltage (V) and a lower clamp voltage (V), which are used as a maximum output voltage and a minimum output voltage of the throttle valve position sensor 30, respectively, are set.

The value adjusted in each adjustment circuit 316, 326 is inputted to a D/A converter 317, 327 to convert from digital to analog and is then outputted as the throttle valve position information from the output lead (OUT 1, OUT 2) 38 of the Hall IC 31, 32 to the external ECU that is connected to the connector 50 via the distal ends 52, 53 of the output terminals 42, 43 of the lead frame 33.

Figure 4A:
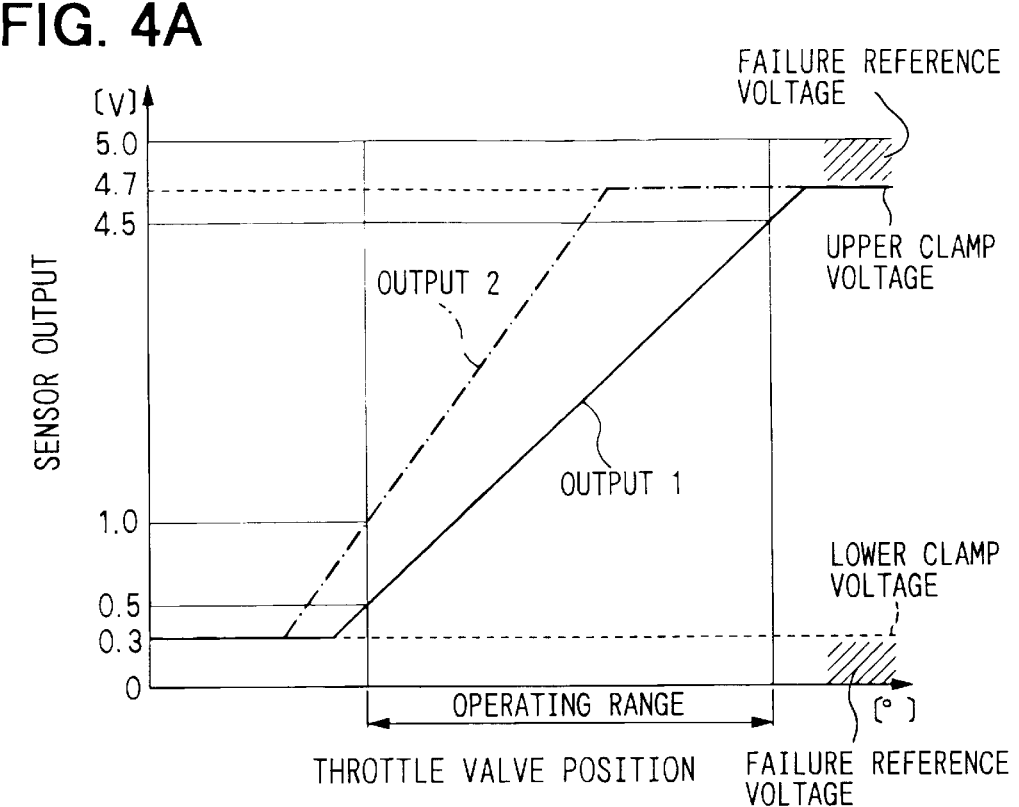
FIG. 4A is a graph showing sensor outputs (V) of the Hall ICs within and around an operating range of the throttle valve position ranging from the initial throttle valve position (−10 degrees) to the full throttle valve position (90 degrees)

The present invention will now be described with reference to FIG. 4A in connection with FIG. 4B. As shown in FIG. 4A, while both the Hall ICs 31, 32 are normal, a sensor output (output 1) of one Hall IC 31 and a sensor output (output 2) of other Hall IC 32 are in a range of 0.5 (V) to 4.5 (V) and in a range of 1.0 (V) to 4.7 (V), respectively, in the operating range of the throttle valve position. When one of the Hall ICs 31, 32 becomes abnormal, the abnormal Hall IC outputs the upper clamp voltage of 4.7 (V) or the lower clamp voltage of 0.3 (V), which are adjusted in the described clamp adjustment, as its maximum or minimum sensor output voltage. Therefore, if a voltage (a failure reference voltage of FIG. 4A) of below 0.3 (V) or above 4.7 (V) is measured as the sensor output in the ECU, the ECU determines that a failure condition of a component other than the throttle valve position sensor 30 itself has occurred (for example, disconnection or short circuit of a wire harness or the like) since such a voltage cannot be outputted from the throttle valve position sensor 30. In this way, the failure of the Hall ICs 31, 32 can be detected throughout the operating range of the throttle valve position.

Figure 4B:
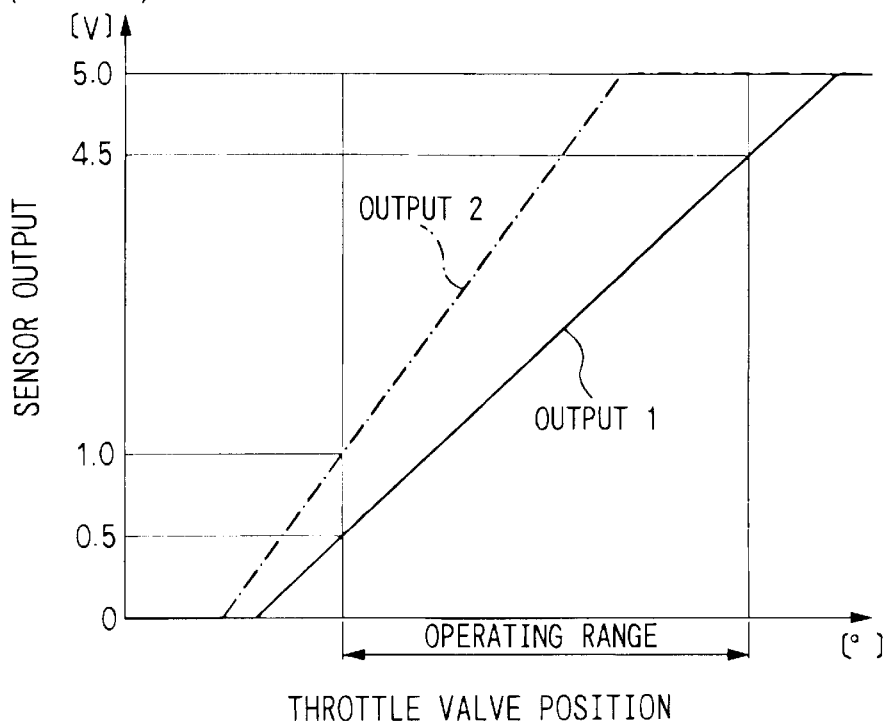
FIG. 4B is a graph showing sensor outputs (V) of the Hall ICs within and around the operating range of the throttle valve position (degrees) according to a prior art.

In contrast, in the prior art, as shown in FIG. 4B, while both the Hall ICs constituting the throttle valve position sensor are normal, an output (output 1) of one Hall IC and an output (output 2) of other Hall IC are in a range of 0.5 to 4.5 (V) and in a range of 1.0 to 5.0 (V), respectively, within the operating range of the throttle valve position. That is, when the throttle valve position is in the high throttle valve position zone, the output 2 of the Hall IC is fixed to 5.0 (V). Furthermore, when one of the Hall ICs becomes abnormal, the abnormal Hall IC outputs 0 (V) or 5.0 (V). Thus, in the high throttle valve position zone where the output 2 of the Hall IC is about 5.0 (V), the ECU, which is externally connected with the throttle valve position sensor, cannot determine whether he throttle valve position sensor is abnormal, or another component is abnormal (for example, disconnection or short circuit of a wire harness or the like).

The failure determination procedure of the throttle valve position sensor carried out in the ECU as part of the method for processing an output of the position measurement sensor according to one embodiment of the present invention will be described with reference to a flowchart of FIG. 5 in connection with FIG. 4A. A failure determination routine shown in FIG. 5 is repeated at predetermined intervals as long as it is determined that both the Hall ICs 31, 32 are normal, that is, a flag FDFAIL and a flag FSFAIL (which will be described in detail below) are both "0" in the previous run.

Figure 5:
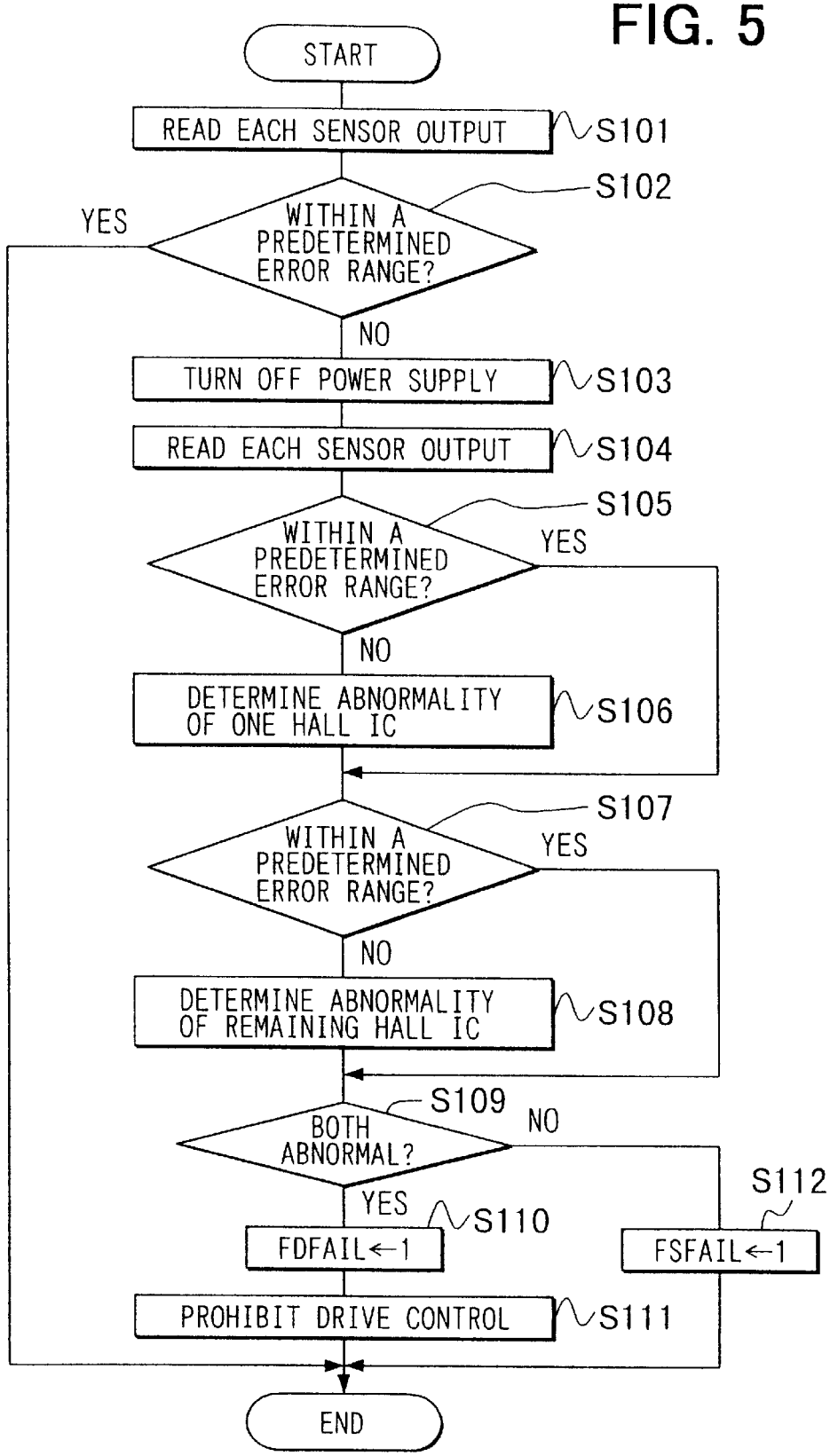
FIG. 5 is a flowchart showing a procedure of failure determination process carried out in an ECU externally connected to the throttle valve position sensor of FIG. 1.

With reference to FIG. 5, first, at step S101, the output 1 of the Hall IC 31 and the output 2 of the Hall IC 32 are read. Then, control passes to step S102 where it is determined whether a relationship between the output 1 and the output 2 read in step S101 is within a predetermined error range of a map (not shown) that is constructed based on a relationship between the output 1 and the output 2 shown in FIG. 4A. If the answer at step S102 is YES, both the Hall ICs 31, 32 are determined to be normal, and the routine ends. In such a case, the drive control of the throttle valve 12 via the motor 20 continues.

In contrast, if the answer at step S102 is NO, at least one of the Hall ICs 31, 32 is determined to be abnormal, and control passes to step S103. At step S103, the motor 20 is turned off, so that the return spring 29 urges the throttle valve 12 via the rotatable shaft 13 to return the throttle valve 12 to the initial throttle valve position.

Then, control passes to step S104 where the sensor output of each Hall IC 31, 32 in the initial throttle valve position is read. For illustrative purpose, it is assumed that 0.5 (V) of the output 1 and 1.0 (V) of the output 2 are read (see FIG. 4A). Then, control passes to step S105 where it is first determined whether the output 1 of the Hall IC 31 read at step S104 is within a predetermined tolerance range, for example, within a range of 0.4 to 0.6 (V). If the answer at step S105 is NO, control passes to step S106 where it is determined that the Hall IC 31 is abnormal. On the other hand, if the answer at step S105 is YES, it is determined that the Hall IC 31 is normal, so that control skips step S106.

Then, control moves to step S107 where it is determined whether the output 2 of the other Hall IC 32 read at step S104 is within a predetermined tolerance range, for example, within a range of 0.9 to 1.1 (V). If the answer at step S107 is NO, control passes to step S108 where it is determined that the Hall IC 32 is abnormal. On the other hand, if the answer at step S107 is YES, it is determined that the Hall IC 32 is normal, so that control skips step S108.

Then, control passes to step S109 where it is determined whether both the Hall ICs 31, 32 are abnormal. If the answer at step S109 is YES, control passes to step S110 where the flag FDFAIL, which indicates that both the Hall ICs 31, 32 are abnormal, is set to "1". Then, control passes to step S111 where the power supply to the motor 20 is turned off, so that the drive control of the throttle valve 12 via the motor 20 is prohibited (or stopped), and the throttle valve 12 is fixed to the initial throttle valve position. Then, the routine is terminated.

On the other hand, if the answer at step S109 is NO, that is, one of the Hall ICs 31, 32 is abnormal, control passes to step S112 where the flag FSFAIL, which indicates that one of the Hall ICs 31, 32 is abnormal, is set to "1". Then, the routine is terminated.

Once the flag FSFAIL is set to "1", the drive control of the throttle valve 12 via the motor 20 is resumed and is conducted based on the output of the remaining normal Hall IC 31, 32 via a control routine (not shown), and an operation mode of the vehicle is changed to a limp-home mode. A time point of resuming the drive control of the throttle valve 12 via the motor 20 is when a demand for a change in an operating condition of the vehicle (such as a demand for acceleration or deceleration) is received from a vehicle driver. This is determined based on a change in output of an accelerator pedal position sensor, a brake switch or the like.

During the limp-home mode of the vehicle operation, an upper protective limit is imposed on the position of the throttle valve 12 for safety reasons. Furthermore, upper protective limits are also respectively imposed on parameters provided for controlling the operating condition of the internal combustion engine, such as the amount of intake air, the engine speed and the like. If any of these parameters reaches its upper protective limit, the drive control of the throttle valve 12 via the motor prohibits further incrementation of the position of the throttle valve 12. Furthermore, after resuming the drive control of the throttle valve 12 via the motor 20, if a relationship between the described parameter and the one of the Hall ICs 31, 32, which has been determined to be normal, is out of a predetermined range, this Hall IC is also determined to be abnormal. Thus, the power supply to the motor 20 is turned off to prohibit (or stop) the drive control of the throttle valve 12 via the motor 20.

The failure determination according to the present invention will be further described with reference to FIG. 4A. The upper clamp voltage (or the maximum output voltage) of 4.7 (V) of the Hall ICs 31, 32 is set to exceed an upper tolerance limit of 4.6 (V) provided for the output voltage of 4.5 (V) at the upper border of the operating range of Hall ICs 31, 32. Furthermore, the lower clamp voltage (or the minimum output voltage) of 0.3 (V) of the Hall ICs 31, 32 is set to exceed a lower tolerance limit of 0.4 (V) provided for the output voltage of 0.5 (V) at the lower border of the operating range of the Hall ICs 31, 32. The upper clamp voltage of 4.7 (V) and the lower clamp voltage of 0.3 (V) are also set to fall between an upper failure reference voltage range that is higher than 4.7 (V) and a lower failure reference voltage range that is lower than 0.3 (V). The upper failure reference voltage and the lower failure reference voltage are set by the ECU and are provided at upper and lower borders of a power supply voltage of 5 (V) applied to the Hall ICs 31, 32, respectively.

That is, if the sensor output voltage of each of the Hall ICs 31, 32 is between the upper tolerance limit of 4.6 (V) and the lower tolerance limit of 0.4 (V), and if a relationship between the sensor output voltage of the Hall IC 31 and the sensor output voltage of the Hall IC 32 is within the predetermined error range, both the Hall ICs 31, 32 are determined to be normal. Also, if the sensor output voltage of the Hall IC 32 is in a range of 4.6 (V) to 4.7 (V), and if the relationship between the sensor output voltage of the Hall IC 31 and the sensor output voltage of the Hall IC 32 is within the predetermined error range, both the Hall ICs 31, 32 are also determined to be normal. In contrast, if the sensor output voltage of the throttle valve position sensor 30 is equal to the upper clamp voltage of 4.7 (V) or the lower clamp voltage of 0.3 (V), and if the relationship between the sensor output voltage of the Hall IC 31 and the sensor output voltage of the Hall IC 32 is out of the predetermined error range, at least one of the Hall ICs 31, 32 is determined to be abnormal due to, for example, disconnection or short circuit. Furthermore, if the sensor output voltage of the throttle valve position sensor 30 is within the upper failure reference voltage range that is above the voltage of 4.7 (V) or within the lower failure reference voltage range that is lower than the voltage of 0.3 (V), it is determined that a connection (such as a wire harness or the like) between the throttle valve position sensor 30 and the ECU is abnormal due to, for example, disconnection or short circuit.

In this way, in the throttle valve position sensor 30, an abnormality of the Hall ICs 31, 32 can be detected throughout the entire operating range of the throttle valve position including the high throttle valve position zone, and also an abnormality of the connection between the throttle valve position sensor 30 and the ECU can be detected. Thus, an appropriate adjustment can be made to detect all failure modes.

Additional advantages and modifications will readily occur to those skilled in the art. The invention in its broader terms is therefore, not limited to the specific details, representative apparatus, and illustrative examples shown and described. For instance, the present invention may be applied to detect a position of a movable body, which moves in a linear direction.

What is claimed is:

1. A method for processing an output of a redundant position measurement sensor having a couple of non-contacting measurement elements for measuring a position of a movable body, wherein:

maximum and minimum output voltages of said measurement elements are set to exceed upper and lower tolerance limits for output voltages of said measurement elements at upper and lower borders of an operating range of said measurement elements, respectively, wherein said maximum and minimum output voltages of said measurement elements are also set to fall between upper and lower failure reference voltage ranges, which are set by an electronic control unit connected to said measurement elements and are provided at upper and lower borders of a power supply voltage applied to said measurement elements, respectively.

2. A method for processing an output of a position measurement sensor according to claim 1, wherein said movable body is a throttle valve that adjusts an amount of intake air supplied to an internal combustion engine, and said electronic control unit detects an abnormality of each said measurement element based on an output voltage of each said measurement element that is outputted while said throttle valve is being returned to an initial throttle valve position within an operating range of said throttle valve.

3. A method for processing an output of a position measurement sensor according to claim 2, wherein if one of said measurement elements is determined to be abnormal by said electronic control unit, other of said measurement elements, which is determined to be normal, is used to resume a drive control operation of said throttle valve.

4. A method for processing an output of a position measurement sensor according to claim 3, wherein a time point of resuming said drive control operation of said throttle valve by said electronic control unit is when a demand for a change in an operating condition of a vehicle is made.

5. A method for processing an output of a position measurement sensor according to claim 2, wherein in said drive control operation of said throttle valve that is carried out when said one of said measurement elements is determined to be abnormal by said electronic control unit, upper protective limits are imposed on a position of said throttle valve and also on a parameter provided for controlling an operating condition of said internal combustion engine, respectively.

6. A method for processing an output of a position measurement sensor according to claim 5, wherein in said drive control operation of said throttle valve that is carried out when said one of said measurement elements is determined to be abnormal by said electronic control unit, if a relationship between said position of said throttle valve and said parameter provided for controlling said operating condition of said internal combustion engine is out of a predetermined range, a power supply to an electric motor that drives said throttle valve to open or close said throttle valve is turned off.

7. An apparatus for processing an output of a redundant position measurement sensor having a couple of non-contacting measurement elements for measuring a position of a movable body, said apparatus further comprising:

means for setting maximum and minimum output voltages of said measurement elements, wherein said maximum and minimum output voltages of said measurement elements are set to exceed upper and lower tolerance limits for output voltages of said measurement elements at upper and lower borders of an operating range of said measurement elements, respectively, wherein said maximum and minimum output voltages of said measurement elements are also set to fall between upper and lower failure reference voltage ranges and are provided at upper and lower borders of a power supply voltage applied to said measurement elements, respectively.

8. An apparatus for processing an output of a position measurement sensor according to claim 7, wherein said movable body is a throttle valve that adjusts an amount of intake air supplied to an internal combustion engine, said apparatus further including control means for detecting an abnormality of each said measurement element based on an output voltage of each said measurement element that is outputted while said throttle valve is being returned to an initial throttle valve position within an operating range of said throttle valve.

9. An apparatus for processing an output of a position measurement sensor according to claim 8, wherein if one of said measurement elements is determined to be abnormal by said control means, said control means uses other of said measurement elements, which is determined to be normal by said control means, to resume a drive control operation of said throttle valve.

10. An apparatus for processing an output of a position measurement sensor according to claim 9, wherein a time point of resuming said drive control operation of said throttle valve by said control means is when a demand for a change in an operating condition of a vehicle is made.

11. An apparatus for processing an output of a position measurement sensor according to claim 8, wherein in said drive control operation of said throttle valve that is carried out when said one of said measurement elements is determined to be abnormal by said control means, said control means imposes upper protective limits on a position of said throttle valve and also on a parameter provided for controlling an operating condition of said internal combustion engine, respectively.

12. An apparatus for processing an output of a position measurement sensor according to claim 11, wherein in said drive control operation of said throttle valve that is carried out when said one of said measurement elements is determined to be abnormal by said control means, if a relationship between said position of said throttle valve and said parameter provided for controlling said operating condition of said internal combustion engine is out of a predetermined range, said control means turns off a power supply to an electric motor that drives said throttle valve to open or close said throttle valve.

* * * * *